(12) United States Patent
Schell et al.

(10) Patent No.: US 8,210,362 B2
(45) Date of Patent: Jul. 3, 2012

(54) CONTROL BOX ARRANGEMENT

(75) Inventors: Michael Schell, Dillenburg (DE); Tobias Becker, Ehringshausen (DE)

(73) Assignee: Rittal GmbH & Co. KG, Herborn (DE)

( * ) Notice: Subject to any disclaimer, the term of this patent is extended or adjusted under 35 U.S.C. 154(b) by 387 days.

(21) Appl. No.: 12/448,240

(22) PCT Filed: Nov. 30, 2007

(86) PCT No.: PCT/EP2007/010441
§ 371 (c)(1),
(2), (4) Date: Jun. 12, 2009

(87) PCT Pub. No.: WO2008/071314
PCT Pub. Date: Jun. 19, 2008

(65) Prior Publication Data
US 2010/0308703 A1    Dec. 9, 2010

(30) Foreign Application Priority Data

Dec. 12, 2006 (DE) .......................... 10 2006 058 781

(51) Int. Cl.
*A47F 7/00* (2006.01)
(52) U.S. Cl. ............ 211/26; 211/182; 211/192; 361/825
(58) Field of Classification Search .................. 211/182, 211/192, 26; 403/254, 297; 361/600, 679.01, 361/807, 809, 810, 825, 826, 829
See application file for complete search history.

(56) References Cited

U.S. PATENT DOCUMENTS

| 4,148,263 A * | 4/1979 | Suttles ............................... 108/1 |
| 4,545,490 A * | 10/1985 | Hsiao et al. .................... 211/191 |
| 4,643,319 A * | 2/1987 | Debus et al. .................. 211/189 |
| 4,712,695 A * | 12/1987 | Cheng ............................ 211/191 |
| 4,869,380 A * | 9/1989 | Metcalfe et al. .............. 211/189 |
| 5,052,565 A | 10/1991 | Zachrei |

FOREIGN PATENT DOCUMENTS

| DE | 40 13 379 C1 | 4/1990 |
| DE | 195 30 016 A1 | 2/1997 |
| DE | 10 2004 054 173 A1 | 5/2006 |
| EP | 0 146 071 | 6/1985 |

OTHER PUBLICATIONS

Co-Pending U.S. Appl. No. 12/311,963, filed Apr. 20, 2009; inventors Michael Schell et al.; title Control Box Arrangement.

(Continued)

*Primary Examiner* — Korie H. Chan
(74) *Attorney, Agent, or Firm* — Pauley Petersen & Erickson

(57) ABSTRACT

A control box arrangement including at least one control box which has a frame constructed from vertical and horizontal frame pieces and which is fitted with, or can be fitted with, mounting parts including mounting rails, for the variable design of the inside of the control box for the division thereof. The frame pieces have rows of mounting holes in a defined pattern. The division of the inside of the control box can be varied by single-component connection pieces for connecting the mounting rails to the frame pieces. The connection pieces include a coupling section which protrudes at a right angle from the connection plane of the associated frame piece when applied. The coupling section has a quadratic or rectangular cross-section and has at least one transversally extending threaded borehole. The four planes of the coupling section are parallel to the vertical plane and the horizontal plane of the control box.

19 Claims, 10 Drawing Sheets

OTHER PUBLICATIONS

Co-Pending U.S. Appl. No. 12/448,236, filed Jun. 12, 2009; inventors Michael Schell et al.; title Control Box Arrangement.

Co-Pending U.S. Appl. No. 12/448,228, filed Jun. 12, 2009; inventors Michael Schell et al.; title Control Box Arrangement.

* cited by examiner

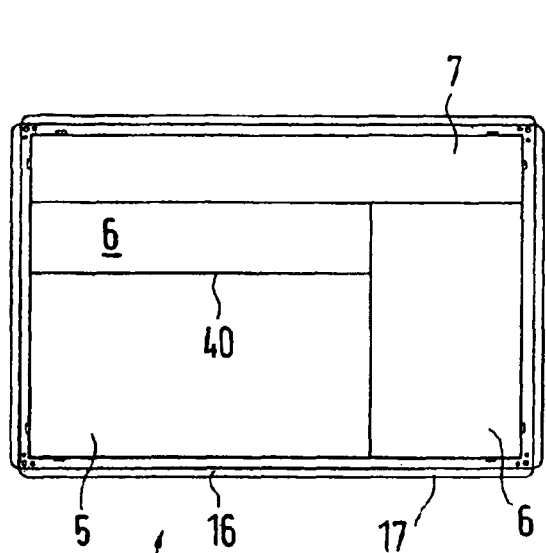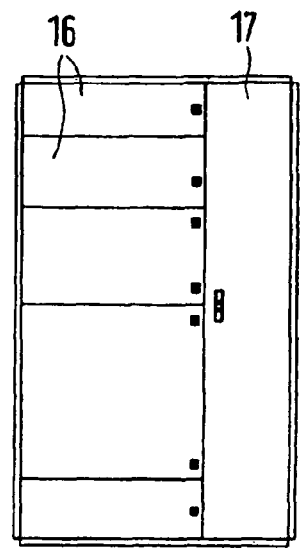
FIG. 2A  FIG. 2B
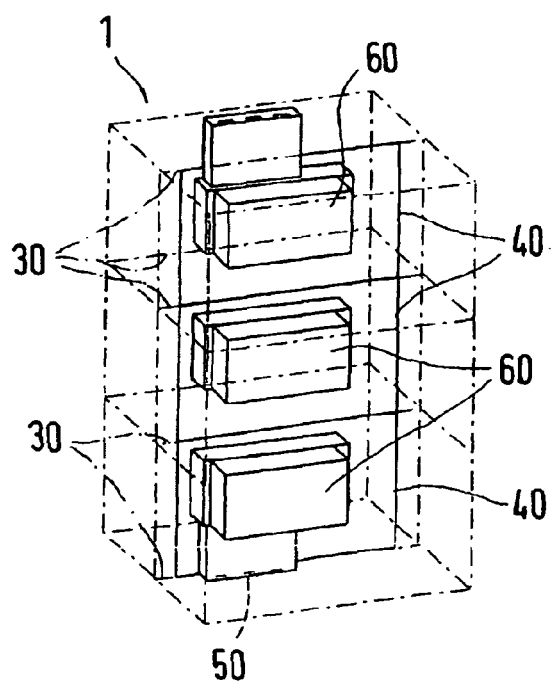
FIG. 3

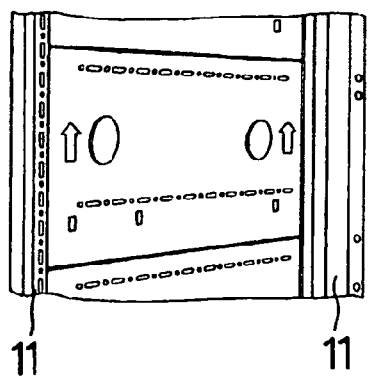
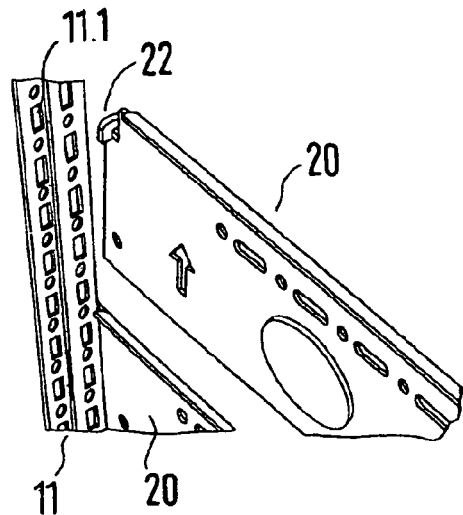
FIG. 8   FIG. 9
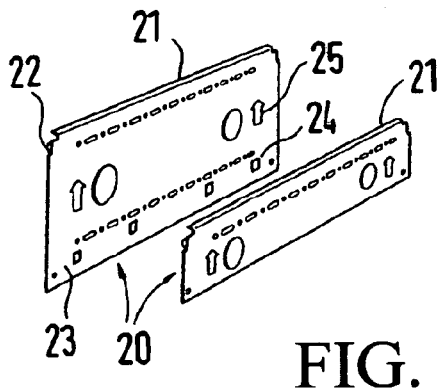
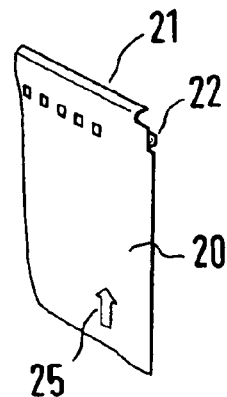
FIG. 10
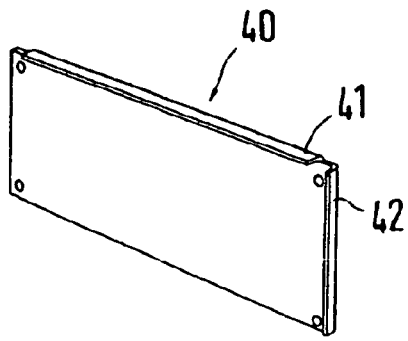
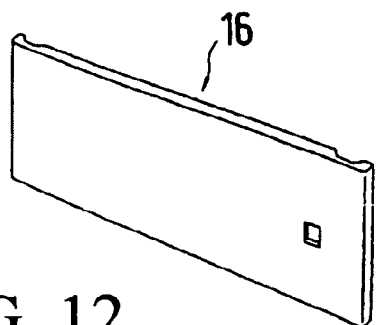
FIG. 11   FIG. 12

FIG. 16
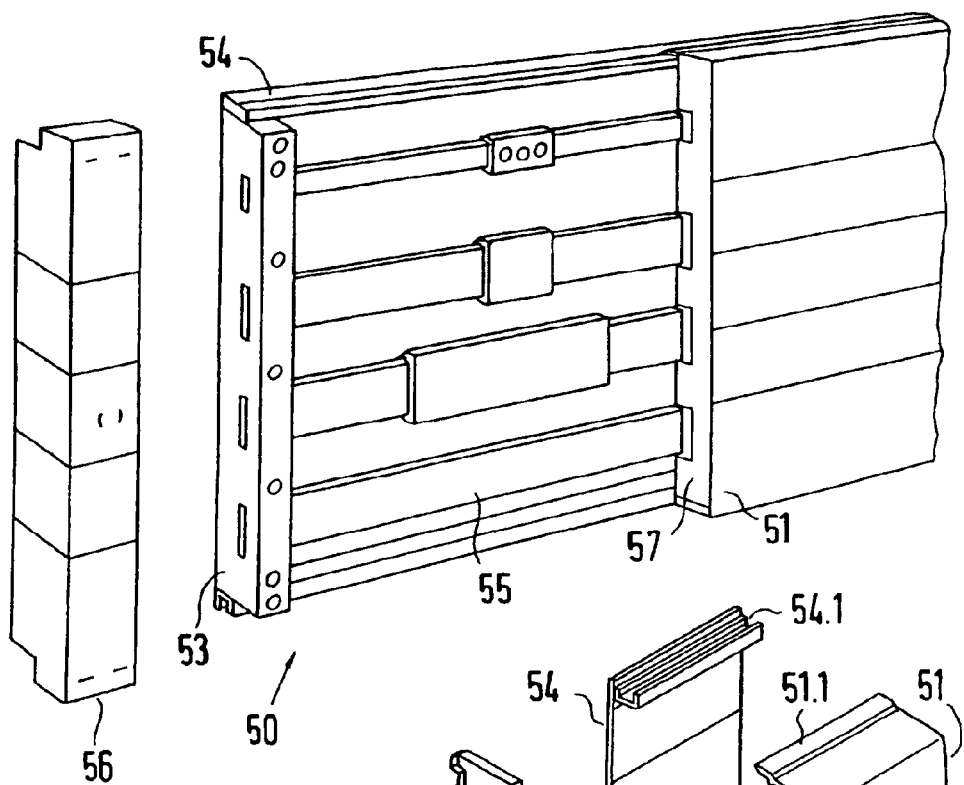
FIG. 18
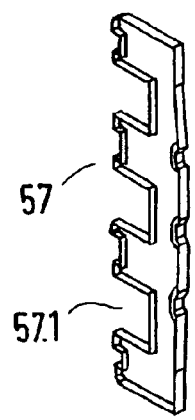
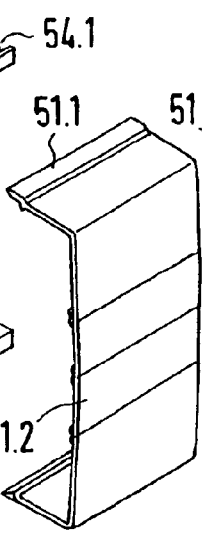
FIG. 17
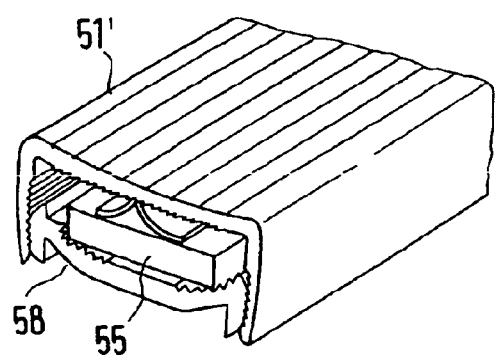
FIG. 19

CONTROL BOX ARRANGEMENT

BACKGROUND OF THE INVENTION

1. Field of the Invention

This invention relates to a control box arrangement having at least one control box, which has a frame constructed from vertical and horizontal frame legs and an interior with or that can be equipped with mounting parts, including mounting rails to permit a variable subdivision of its interior and having frame legs provided with rows of fastening holes in a defined pattern.

2. Discussion of Related Art

German Patent Reference DE 40 13 379 C1 discloses a control box arrangement with a control box, in which an interior can be subdivided in various ways to produce a plurality of horizontal compartments arranged one above the other, and mounting rails extending in a depth direction are attached to the vertical frame legs.

German Patent Reference DE 10 2004 054 173 A1 discloses another control box arrangement with a control box having an interior subdivided into a plurality of compartments. In this known control box, vertical dividing walls separate a device compartment, which is accessible from the front for the installation of electrical devices, from a laterally adjacent cable connection compartment and from a bus bar compartment situated behind it in the rear region of the control box interior. A support structure for the dividing walls is not described in further detail.

SUMMARY OF THE INVENTION

One object of this invention is to provide a control box arrangement of the type mentioned above but which permits variable embodiments of the interior with the lowest possible assembly complexity.

This object is accomplished with characteristics discussed in this specification and in the claims. According to this invention, one-piece connecting pieces for connecting the mounting rails to the frame legs have a coupling section that protrudes at right angles from the attachment plane of the associated frame leg when the connecting piece is mounted in position. The coupling section has a square or rectangular cross section and contains at least one transversally extending threaded bore. The four planes of the coupling section are oriented parallel to the vertical plane and the horizontal plane of the control box.

These features permit a variable embodiment of the control box interior with a simple, stable construction.

In this case, assembly is facilitated by each plane of the coupling section containing at least one threaded bore, with a distance from the attachment plane of the associated frame leg that corresponds to an integral multiple of the pattern spacing.

Other features that advantageously facilitate a stable, uniquely defined assembly include that for attachment to the associated frame leg, the connecting piece has an attaching section with an attachment plane that extends parallel to the attachment plane of the frame leg and that has a hook-like securing projection protruding from it that can be hooked into a fastening hole of the frame leg.

A simple, stable attachment is facilitated by a through bore being in the attaching section of the connecting piece, to allow a fastening screw to be inserted through it.

An increased stability and the possibility of mounting in various spatial directions are also advantageously facilitated if the mounting rail has a plurality of profile legs oriented at right angles to one another, with a width that is matched to a cross section of the coupling section of the connecting piece.

In some embodiments, the cross section of the mounting rail is in a right-angled fashion, as two-legged, U-shaped, C-shaped, or in the form of a closed hollow profile and is matched to the cross section of the coupling section. In addition, all of the profile legs of the mounting rail have the same rows of fastening holes as the frame legs.

A uniquely defined connection is helped if the coupling section transitions via a shoulder on all sides into the adjacent widened section of the connecting piece and the height of the shoulder corresponds approximately to the wall thickness of the mounting rail.

Advantageous features for the spatial subdivision include the connecting horizontally and vertically arranged mounting rails, corner connectors, cross connectors, and/or T-pieces having connecting sections that are square or rectangular in cross section and with cross-sectional dimensions are matched to the widths the profile legs of the mounting rails and that have transversely extending threaded bores in their support surfaces, matched to the pattern spacing of the rows of fastening holes. With solid angles and three-dimensionally intersecting connectors, it is possible to produce connections in all three spatial directions.

Advantageous mounting options are also possible with rows of fastening holes having an alternating pattern of round holes and slot-shaped holes extending in the longitudinal direction of the frame legs or mounting rails.

Other advantageous mounting options include the frame legs having mounting planes that are offset from each other in the width direction and/or in the depth direction and connecting pieces for attachment in both mounting planes.

A spatial subdivision that is advantageous for low-voltage equipment, for example, is achieved by the vertical mounting rails being attached to frame legs and/or horizontal mounting rails offset in the depth direction toward the inside of the control box arrangement and in the depth direction in front of the vertical mounting rails, functional compartments are formed, which are situated one above the other, divided from one another by horizontal compartment-dividing floors, and closed at the rear by mounting plates attached to the vertical mounting rails. Distributing rails, which extend vertically through a plurality of functional compartments are for supplying power to device components accommodated in the functional compartments, and are mounted to the inside surface of the mounting plates.

BRIEF DESCRIPTION OF THE DRAWINGS

This invention is explained in greater detail in view of exemplary embodiments shown in the drawings, wherein:

FIGS. 2A and 2B show a control box arrangement with a control box, in a top view of a plurality of compartments formed by vertical dividing walls and a front view of a plurality of horizontally divided compartments with compartment doors;

FIG. 3 is a perspective, transparent depiction of a control box with horizontally divided compartments and a distributing rail system to which device components are connected;

FIG. 8 is a view from an inside of a side wall region of a control box, with lateral wall sections;

FIG. 9 is a perspective view of a side wall region of a control box, with a detached side wall section;

FIG. 10 is a perspective view of two side wall sections of different heights and an enlarged detail of a corner region of a side wall section;

FIG. 11 is a perspective view of a component-mounting plate;

FIG. 12 is a perspective view of a compartment door;

FIG. 16 is a perspective detail view of an embodiment for a bus bar arrangement of a main rail arrangement and/or of a distributing rail arrangement;

FIG. 17 is a perspective, exploded detail view of a bus bar support and a bus bar cover;

FIG. 18 shows a support plate for a bus bar arrangement according to FIG. 16;

FIG. 19 shows an individual support of a bus bar with an individual cover;

DETAILED DESCRIPTION OF THE INVENTION

Figure 1:
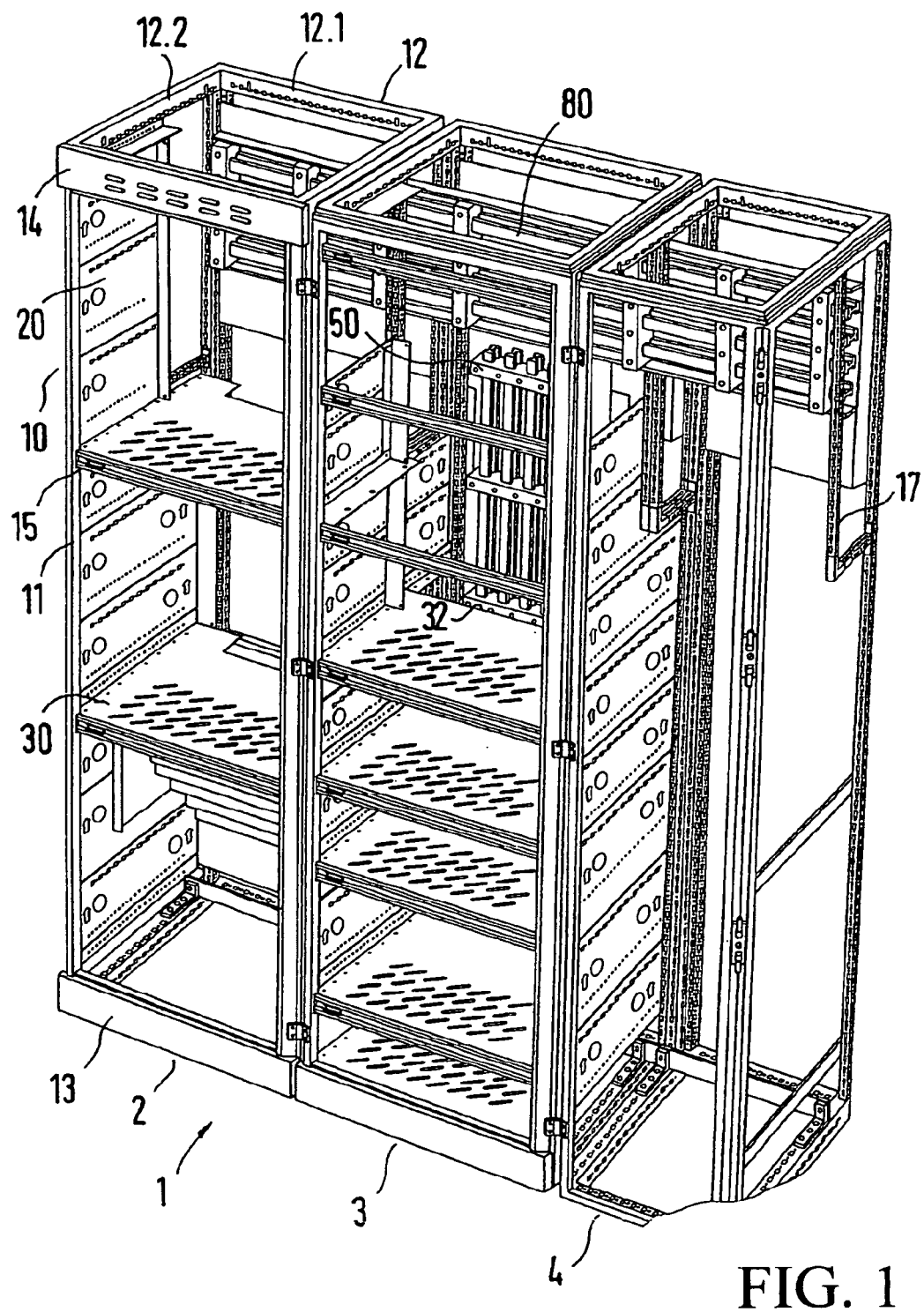
FIG. 1 is a perspective view of a control box arrangement, with the doors removed and with some of the wall elements removed, which has a plurality of functional compartments.
Figure 6:
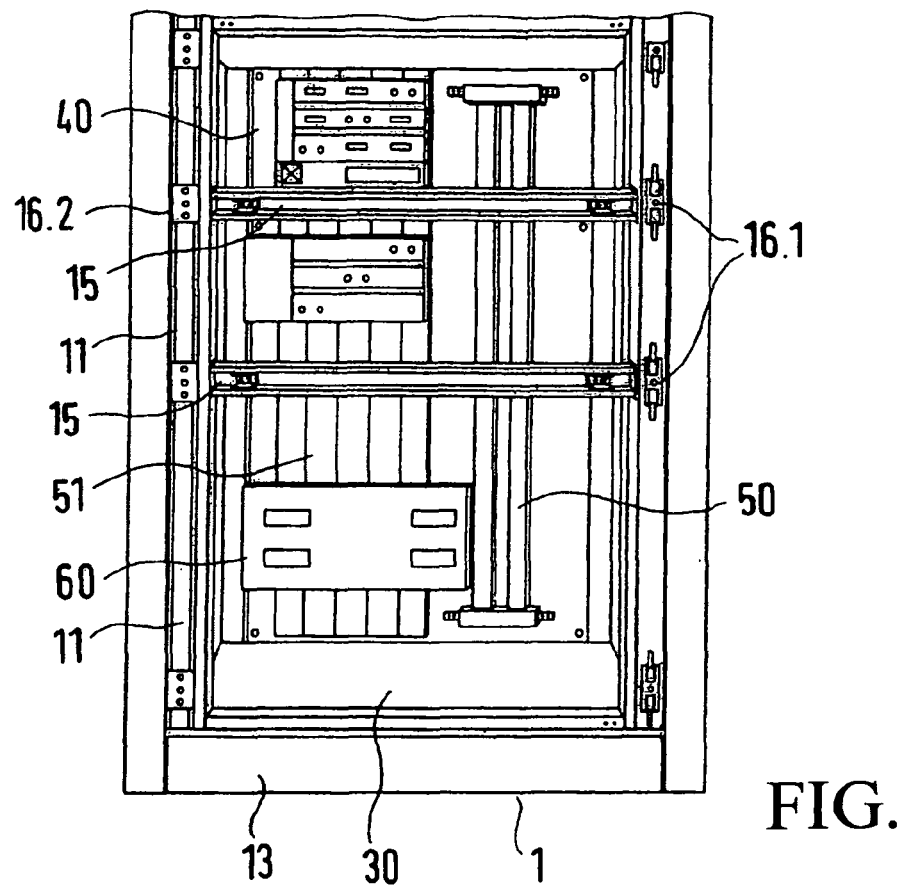
FIG. 6 is a perspective front view of a detail of a control box that has a plurality of horizontally divided functional compartments and that has a distributing rail system.
Figure 7:
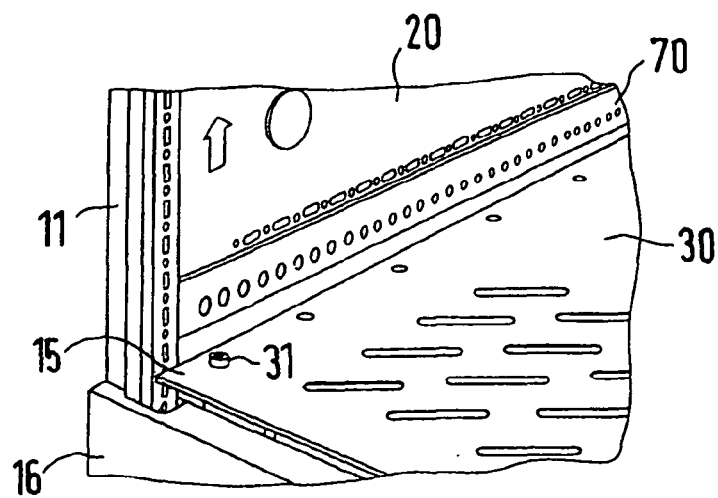
FIG. 7 is a perspective view of a detail of a control box in a corner region of a compartment embodied in the form of a functional compartment.
Figure 14:
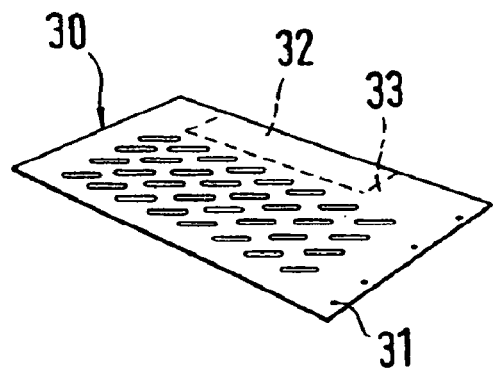
FIG. 14 is a perspective view of a compartment-dividing floor.

FIG. 1 shows a control box arrangement 1 with a plurality of control boxes 2, 3, 4 situated in a row, with their respective frames next to one another. The right control box has a narrower width than the other two control boxes 2, 3 and has only one continuous inner compartment, extending from the top to the bottom, whereas the two other control boxes 2, 3 have a plurality of horizontal compartments 5 situated one above the other, in the form of functional compartments of different heights. In the rear region of or near the control box arrangement 1, there is a main rail system with a plurality of horizontally extending conductor rails, while in the middle control box 3, there are vertical distributing rails connected to the main rails by electrically conductive connecting elements with adapted current-carrying properties. The distributing rails extend vertically through a plurality of functional compartments and are mounted by corresponding bus bar holders to the front surface of back wall sections in the form of mounting plates 40 associated with the functional compartments and are accessible from the interior of the functional compartments. Appropriate device adapters for connecting device components are mounted on the distributing rails in a conductive fashion. Spaces between the device adapters are sealed by insulating covers so that they cannot be touched from the interior of the functional compartments. The distributing rails extend through a plurality of functional compartments situated one above the other and corresponding cutouts 32, which are adapted to the dimensions of the distributing rails with the covers, are in the rear region of horizontal compartment-dividing floors 30, such as shown in FIGS. 6 and 14.

FIG. 1 also shows that the control boxes 2, 3, 4 have frames 10 with four vertical frame legs 11 situated in the corner regions and have top frames with frame legs 12.1 and 12.2 extending in the width direction and the depth direction, respectively. The control boxes 2, 3, 4 each has a respective base 13. Divider strips 15, which are U-shaped in cross section and whose open sides are oriented toward the front, are situated in the region of the front edge of the compartment-dividing floors 30. The free ends of the side legs 15.1, 15.3 are flush with the front edges of the vertical frame legs 11 and the front plane of the frame 10. An upper front panel 14 is attached to the front surface of the top frame 12. In order to close the front side of the control boxes, either a front door that extends all the way from top to bottom is provided or compartment doors 16 that are associated with the respective functional compartments and is adapted to them in height, such as shown in FIG. 12, are provided, which are supported on respective hinge parts 16.1 mounted on the vertical frame legs 11 in articulating fashion by complementary hinge parts and can each be separately closed by respective associated closing parts 16.2 situated on the opposite vertical frame legs 11.

The horizontal compartments 5 situated one above the other and in the form of functional compartments are delimited laterally by side wall sections 20 adapted to the height of the functional compartments and the front vertical edge regions of the side wall sections 20 are each mounted onto the associated vertical frame leg 11 while their rear vertical edge regions are each mounted either to the respective rear vertical frame legs 11 or to respective vertical mounting legs that are situated in the plane of the rear wall sections of the functional compartments. In addition to the side wall sections 20 laterally delimiting the functional compartments, the associated control boxes 2 and 4 are closed by continuous outer side walls, and are also closed at the back and top of the control box arrangement 1.

In their upper edge region, the side walls 20 are first bent inward and upward at an obtuse angle with respect to the functional compartment and are then bent diagonally outward and upward again, parallel to the upper edge, as is also shown in FIGS. 9 and 10. A bent hook element 22 protruding outward from the plane of the side wall section 20 is situated in the upper corner region. This hook element 22 is adapted to the length of vertically oriented oblong holes in the associated vertical frame leg 11 or mounting leg and can be hooked into it with a downward-protruding securing protrusion. Preferably, the vertical frame legs 11 have an inner lateral mounting plane bordering the front frame region of the frame 10 and, on the side oriented away from the front surface and offset laterally toward the outside, have an outer lateral mounting plane likewise oriented toward the inner side of the frame leg 11. Both the inner and outer mounting planes of the vertical frame legs 11 have rows of fastening holes. By the hook elements, the side wall sections 20 are hooked preferably into the outer, laterally recessed mounting plane. The vertical mounting leg also has a corresponding row of fastening holes in the corresponding plane. In addition to the hook elements 22, the lower, front and rear corner regions of the side wall sections 20 have fastening holes that coincide with fastening openings in the vertical frame legs 11 and the related vertical mounting legs and permit a screw connection for securing purposes. In addition, the side wall sections 20 have a horizontally extending arrangement of holes 24 in their lower edge region 23 and possibly also in their upper edge region 21 or upper section. To assure correct orientation, with the upper edge, which is bent in the above-described way, pointing toward the top, the side wall sections 20 each has orientation marks 25 in the form of arrows pointing upward. In addition, they have an opening, which is either covered by a removable plate or can be broken open along a perforation, to provide access from the side, such as into a cable space situated next to it. The heights of the side wall sections 20 are preferably adapted to the height of a functional compartment, preferably in a certain spacing dimension, in particular in accordance with integral multiples of height units HE. In this connection, side wall sections 20 of different heights can be provided to form functional compartments of different heights.

Accordingly, the heights of the component-mounting plates 40 and the compartment doors 16 are also adapted to the height of functional compartments in a particular spacing pattern, in accordance with integral multiples of height units, thus yielding a type of building block system for constructing desired functional compartments that can be also arranged at different heights of the control box interior in accordance with the rows of holes and their spacing patterns in the vertical frame legs 11 and vertical mounting legs.

Figure 13:
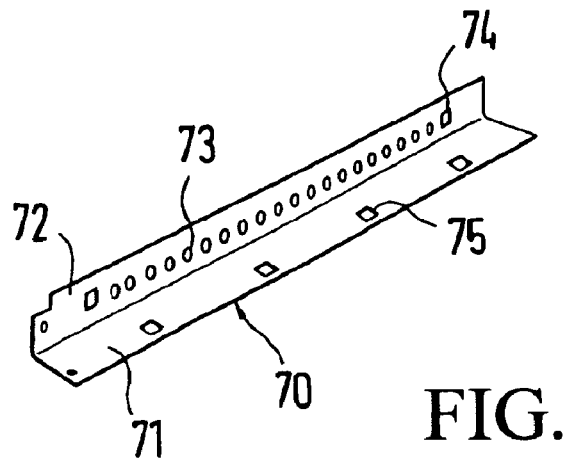
FIG. 13 is a perspective view of a mounting angle.

Mounting angles 70, which can be attached laterally to the side wall sections 20 and/or to the vertical frame legs 11 or the vertical mounting rails, are provided for arranging the compartment-dividing floors 30. The mounting angles 70 extend with a vertical leg 72 along the associated side wall section 20 and protrude with their horizontal leg 71 toward the interior of the control box. The top surfaces of two opposing horizontal legs 71 accommodate a compartment-dividing floor 30, which can be connected to them by elements, in particular screws, which engage in openings in a row of holes 73 or an arrangement of holes 31, such as shown in FIGS. 13 and 14. The horizontal legs 71 protrude beyond the inner mounting plane of the vertical frame legs 11 into the interior and the dimension of the compartment-dividing floor 30 in the width direction is at most as wide as the distance between two opposing inner mounting planes so that the compartment-dividing floor 30 can be easily inserted into the control box interior and fastened to the mounting angles 70, with the cutout 32 also properly positioned with respect to the distributing rails.

FIGS. 2A and 2B show possible ways to divide the space inside a control box, first horizontally by vertical dividing walls and then vertically by the horizontal compartment-dividing floors 30.

Figure 4:
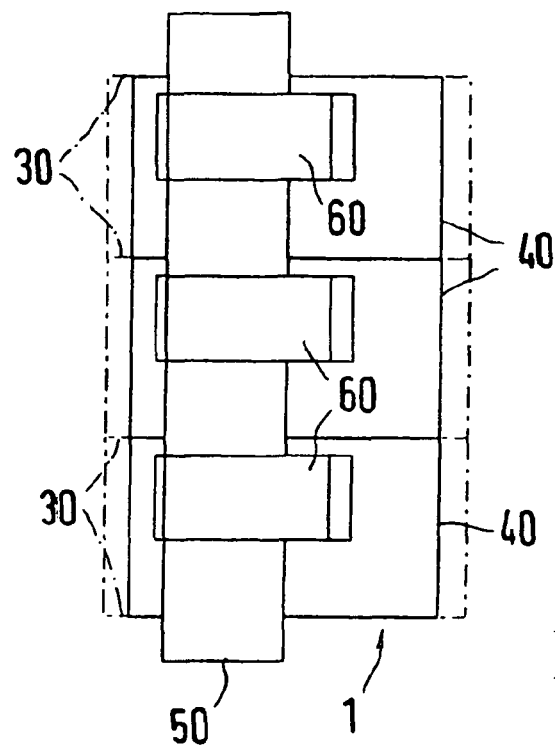
FIG. 4 is a front view of the embodiment according to FIG. 3.
Figure 5:
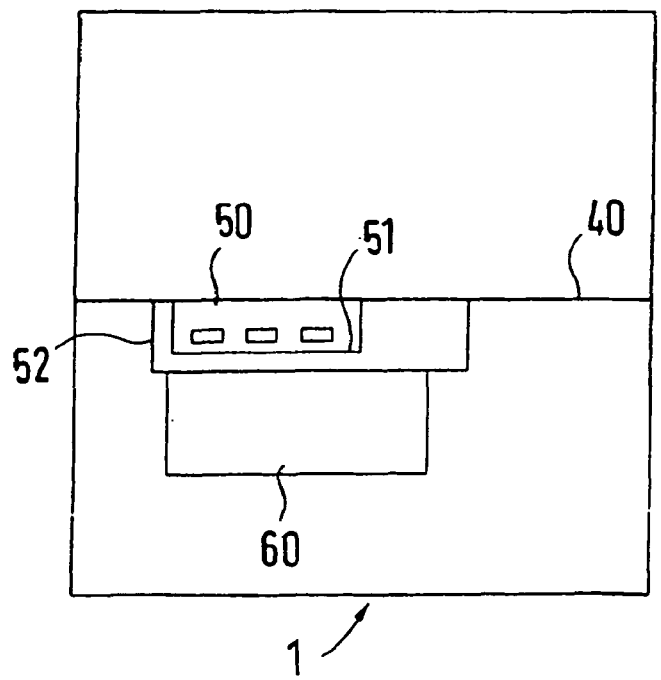
FIG. 5 is a top view of the embodiment according to FIG. 3.

FIGS. 3, 4, and 5 show the distributing rail arrangement 50 with the bus bar cover 51 and device adapters 52 mounted on the distributing rail arrangement 50, as well as switching equipment components 60 connected to them. FIG. 6 also shows the arrangement of distributing rails 50 extending through a plurality of functional compartments and their routing through the cutouts 32 in the rear region of the compartment-dividing floors 30. As shown in FIG. 14, a perforation 33 can be provided in the rear edge region of the compartment-dividing floor 30, thus permitting the cutout 32 to be simply broken open when needed. The cutout 32 is open to the rear edge of the compartment-dividing floor 30 so that the compartment-dividing floor 30 can also easily be subsequently placed at any height in the control box interior and can also be removed again, without requiring removal of the arrangement of distributing rails 50.

As shown in FIG. 13, the mounting angle 70 can be hooked onto or attached to the arrangement of holes 24 in the associated side wall section by fastening holes 74, 75 and possibly by hook-shaped tabs that are bent sideways on the rear surface oriented away from the interior.

Figure 15:
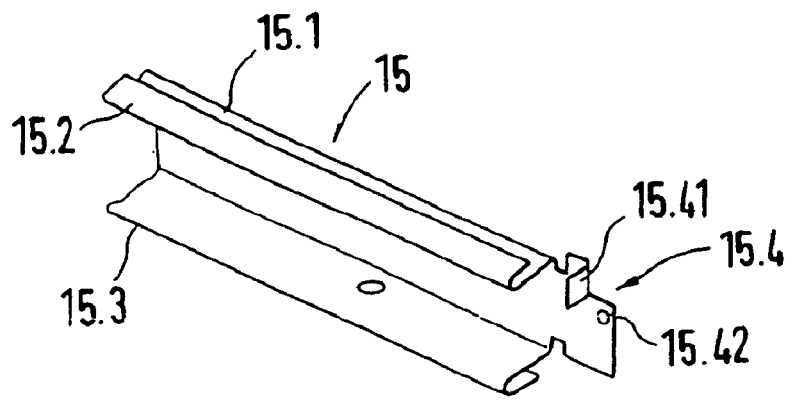
FIG. 15 is a perspective view of a section of a divider strip.

As shown in FIG. 15, the main strip piece 15.2 of each U-shaped divider strip 15 has lateral fastening sections 15.4 extending from it, at both ends, which engage behind shoulders on the rear surface of the vertical frame legs 11 in the installed position and are fastened by screws inserted through fastening openings from the rear. In addition, open regions and bent-back securing elements 15.41 can be provided in the corner region of the fastening sections 15.4.

Figure 20:
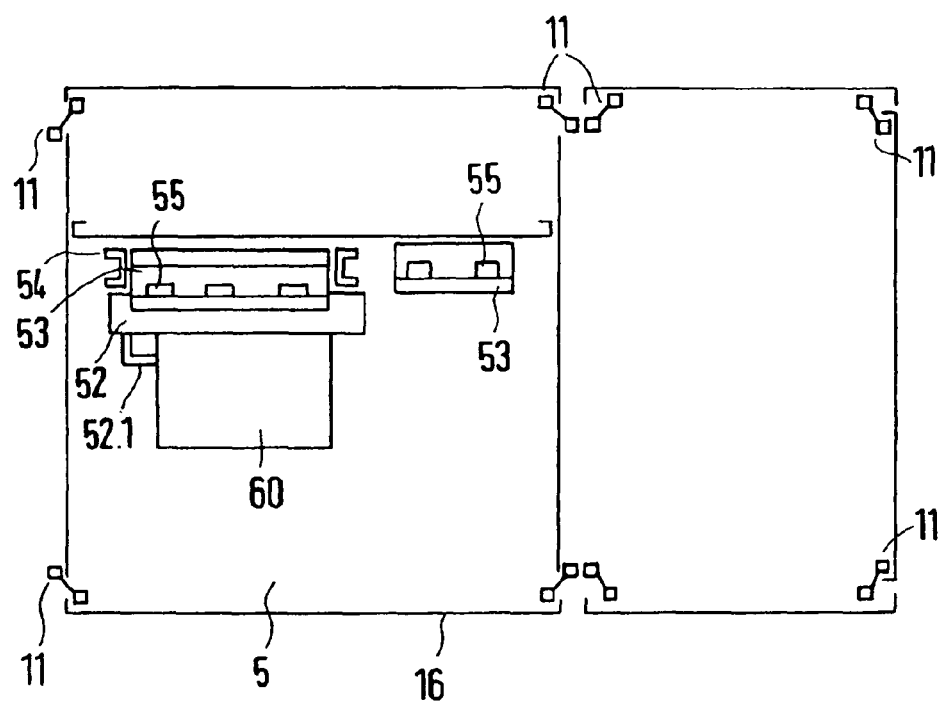
FIG. 20 shows a horizontal cross section taken through a control box arrangement in a plane of a functional compartment.

FIG. 16 shows a bus bar arrangement, for example the distributing rail arrangement 50, such as shown in FIG. 20, and the layout can also be used in a similar fashion for a main rail arrangement 80, such as shown in FIG. 1. The bus bars, such as the distributing rails 55 in the current instance, are accommodated in a trough-shaped, cross-sectionally U-shaped bus bar support 54 with a base part that is relatively wide in accordance with the arrangement of bus bars and has edges that are relatively low in comparison to its width. The edges are in the form of securing pieces 54.1 equipped with securing structures provided to allow the cover 51, which extends over the entire width of the bus bar support 54, to be snapped on and locked in detent fashion by corresponding counterpart structures. The distributing rails 55 are covered by a covering part 51.2 and the counterpart structures are formed onto side pieces 51.1 that protrude laterally from the cover piece.

This produces an insulating, shockproof covering of the bus bars or distributing rails 55 that can be adapted, for example, to free regions between adapters placed onto the bus bars. In order to provide a seal at the front, also in the region between or near a covering part 51.2 of the cover 51 and the bus bars and base part of the bus bar support and also to provide a support in the end region of the cover 51, a support plate 57 is provided, which is matched to the cross section of the space between the cover and the bus bar support and has recesses 57.1 for the bus bars, as shown in FIGS. 16 and 18. The support plate 57 has securing grooves in its edge region oriented toward the underside of the cover 51, which cooperate in a fixing fashion with projections on the underside of the cover 51.

The bus bars are attached in the trough-like bus bar support 54 by bus bar holders 53 that are inserted into it and fixed in position. The bus bar holders 53 have a lower part with recesses for the bus bars 55 and an upper part that can be placed onto it and affixed by screws. In order to achieve a shockproof closure at the end, an end cover 56 is provided, whose upper region also overlaps a bus bar holder 53 positioned at the side.

In the distributing rail arrangement 50, the bus bar support, together with the bus bars 55 situated inside it, the cover, and the device adapters, are attached to the mounting plates 40 so that it extends through a plurality of functional compartments, as described above. Correspondingly, for the main rail arrangement 80, the bus bar support 54 with the bus bars can be mounted horizontally in the rear region of or near the interior. The connection between the main rails and the distributing rails 55 is produced by laminated copper rails and connecting clamps or bolts or also by flexible conductors and connecting elements. In order to produce the connection, in addition to fully closed mounting plates, there are also mounting plates with recesses to function as feed-throughs. The feed-throughs are closed with cable bushings and/or insulating material.

FIG. 19 shows an individual bus bar 55 mounted on an insulating individual mount 58 and covered in a shockproof way by an individual cover 51'. The individual cover is likewise mounted in detent fashion on lateral holding structures of the individual mount 58 by counterpart structures situated on the inner surface of side sections, and has supporting means on the inside that permit the bus bar 55 to be affixed to stepped mounting elements.

FIG. 20 shows a depiction similar to FIG. 5, but with an additional compartment situated to the side of the functional compartments 5, for example a cable routing compartment, as well as the vertical frame legs 11 with the inner and outer mounting plane. The drawing also shows a connection 52.1 between the device component 60 and the device adapter 52. In addition, the bus bar support 54 mounted to the mounting plate 40 is shown in the drawing, with the bus bar holders 53 attached to it, as in FIG. 16. A subsystem of the distributing rails is also mounted on the mounting plate, with two distributing rails 55.

Figure 21:
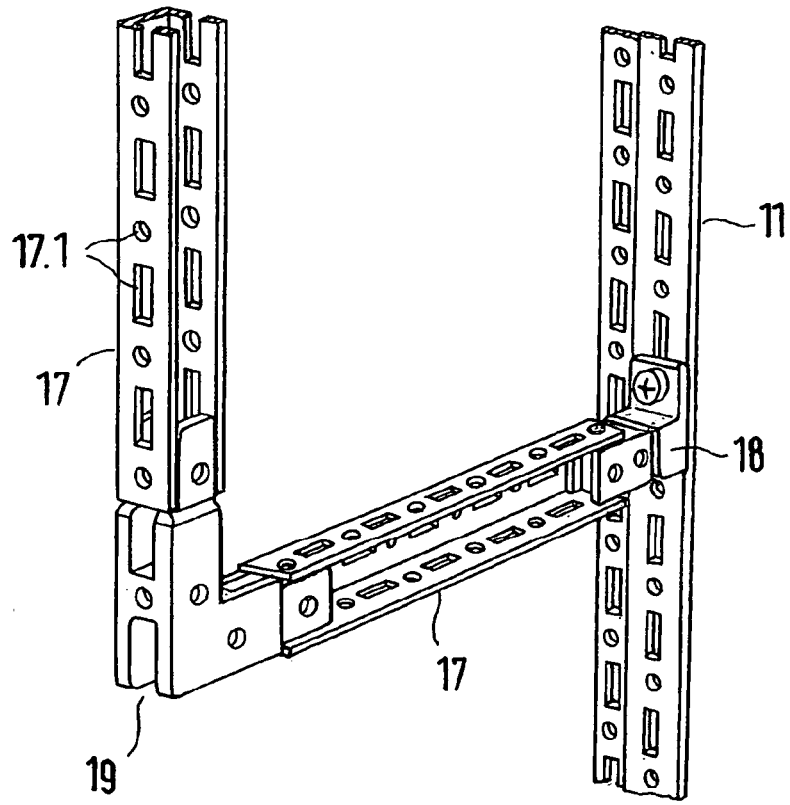
FIG. 21 is a perspective detail view of mounting rails attached to a frame leg of the control box arrangement.
Figure 22:
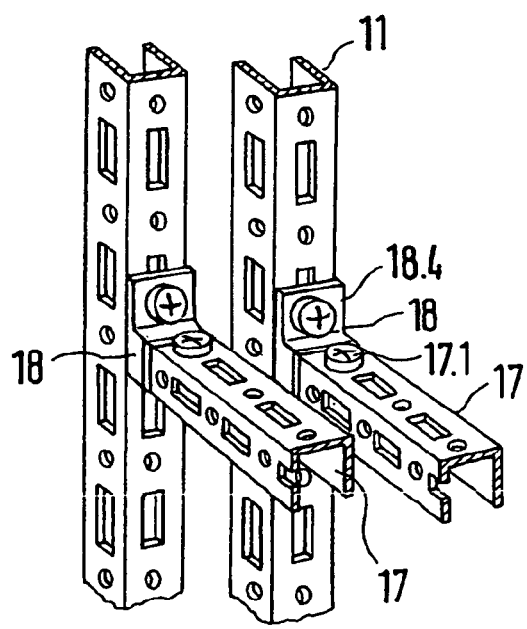
FIG. 22 shows two mounting rails attached in different mounting planes of frame legs of the control box arrangement.

FIG. 21 gives a more detailed depiction of the attachment of mounting rails 17, as is shown in FIG. 1. For example, horizontal mounting rails 17, such as extending in the depth direction, are attached to rear vertical frame legs 11 of the frame 10, either in the front or rear mounting plane of the associated vertical frame leg 11, see FIG. 22, by associated connecting pieces 18. The horizontal mounting rails 17 can be connected to other mounting rails, such as the depicted mounting rail 17 extending vertically upward, by a respective corner connector 19, T-connector, or cross connector. The mounting rails 17 and frame legs 11 each has rows of fastening holes or a hole system 17.1 that has the same spacing pattern, in which slot-shaped holes extending in the longitudinal direction alternate with round holes 17.1 situated between them. As clear from FIG. 22, the connecting pieces 18 are affixed to the associated attachment planes of the frame legs by attaching sections 18.4 and secured by screws that are each inserted through a respective holding bore 18.5, as shown in greater detail in FIGS. 24 and 25.

Figure 24:
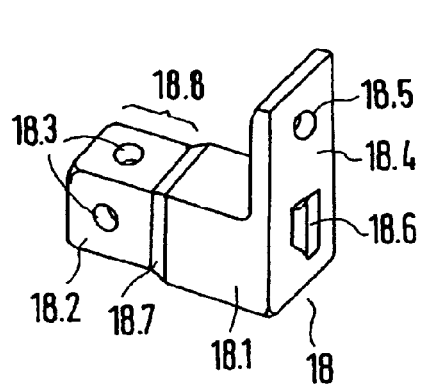
FIG. 24 and FIG. 25 are perspective views of two different exemplary embodiments of connecting pieces for attaching mounting rails to frame legs of the control box arrangement.
Figure 25:
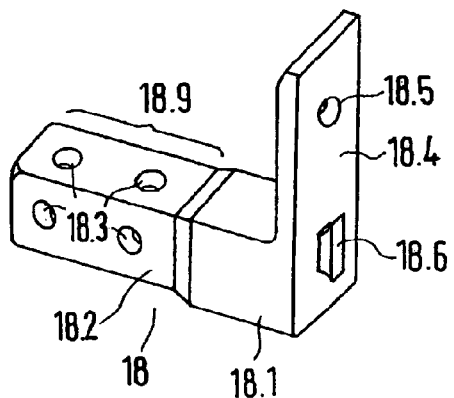
Figure 26:
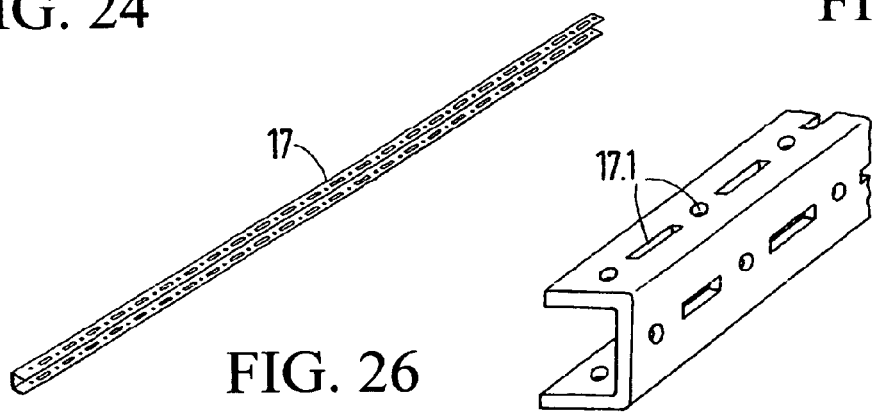
FIG. 26 shows perspective views of an enlarged detail of and a whole mounting rail.

The attaching section 18.4, as shown in FIGS. 24 and 25, has a hook-like securing projection that protrudes from the attachment plane and with an insertion cross section that approximately corresponds to the rectangular slot of the hole system 17.1 or rows of fastening holes in the frame legs to permit the connecting piece 18 to be pre-positioned in the slot-like holes and then affixed by the screw inserted through the through bore 18.5. The connecting body 18.1 of the connecting piece 18 has a cross-sectionally rectangular or preferably square coupling section 18.2 formed onto it, which extends at right angles to the attachment plane of the attaching section 18.4 and has four support surfaces 18.8, 18.9 whose planes extend parallel to the vertical and horizontal control box planes when the connecting piece 18 is in the installed position. The support surfaces 18.8, 18.9 have threaded bores 18.3 into which screws, which are guided through the associated holes of the hole system 17.1 of the mounting rail 17, can be screwed. For a uniquely defined, stable attachment of the mounting rail 17, the coupling section 18.2 transitions into the expanded section of the connecting body 18.1 via a shoulder extending all the way around it, producing a collar-like contact, with the height of the shoulder approximately corresponding to the wall thickness of the mounting rail 17. The mounting rail 17 is in the form of a profile with a plurality of profile legs oriented at right angles to one another, in the current instance in the form of a U-shaped profile, with the same hole system 17.1 provided in all of the profile legs. In lieu of a U-shaped profile, is also possible, for example, to use a square hollow profile, but this can make the mounting require more labor because the U-shaped profile can be simply slid onto mounted connecting pieces from the side. The cross section of the coupling section 18.2 is matched to the internal cross section and leg width of the mounting rail 17. As shown in FIGS. 24 and 25, the securing projection 18.6 has hook-like extensions at both ends in the longitudinal direction of the slot so that the connecting pieces 18 can be hooked with their attaching sections 18.4 oriented upward or downward. In the exemplary embodiment according to FIG. 25, the coupling section 18.2 is elongated in comparison to the exemplary embodiment according to FIG. 24 and two threaded bores 18.3 that are offset from each other in the axial direction are provided in the support surfaces 18.9. The threaded bores 18.3 are advantageously spaced apart from the attachment plane of the attaching piece 18.4 by an integral multiple of the pattern spacing so that when they are attached to the frame legs 11, 12.1, 12.2 and possibly additional mounting rails, this always produces uniquely defined horizontal and vertical arrangements in which they are oriented at right angles.

Figure 23:
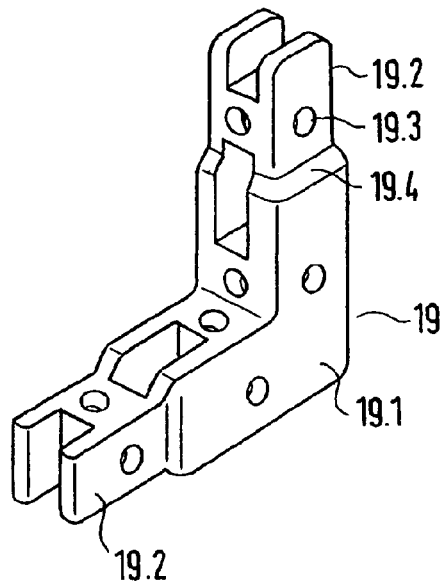
FIG. 23 is a perspective view of a corner connector for mounting rails.

In a manner corresponding to that of the connecting piece 18, but on both legs, the corner connector 19 has insertable coupling sections and attaching sections 19.2, whose cross sections are matched to the cross section of the mounting rail 17 and on the respective support surfaces, have threaded bores 19.3 oriented perpendicular to the support surfaces, as shown in FIG. 23. Correspondingly, T-connectors or cross connectors can also be provided with connecting legs oriented three-dimensionally with respect to each other.

The above-described functional compartments and other compartments can be constructed in a stable, simple fashion by mounting rails attached in the above-described way. In this connection, it is possible for a vertical mounting rail 17, starting from a certain height inside the control box, to be guided so that it is offset by a desired depth from the front surface or rear surface of the control box in order for component-mounting plates 40 to be attached to it. The side wall sections 20 can be attached with their rear, vertical edges against the mounting rails 17 or can extend all the way to the rear vertical frame leg 11. It is also possible to partition off cable routing compartments of any width using mounting rails 17 extending laterally in the width direction.

The above-described modular design for the compartments inside the control box permits variable arrangements to be produced with a simple assembly, while also satisfying the high functional reliability standards of the type required for low-voltage equipment.

The invention claimed is:

1. A control box arrangement comprising: at least one control box (2, 3, 4) having a frame (10) constructed from vertical and horizontal frame legs (11, 12.1, 12.2) and an interior equippable with mounting parts including mounting rails (17) to permit a variable subdivision of the interior and having the frame legs (11, 12.1, 12.2) with rows of fastening holes in a defined pattern, one-piece connecting pieces (18) for connecting the mounting rails (17) to the frame legs (11, 12.1, 12.2) having a coupling section (18.2) protruding at right angles from an attachment plane of the associated frame leg (11, 12.1, 12.2) when the connecting piece is in a mounted position, the coupling section (18.2) having a square cross section or a rectangular cross section and contains containing at least one transversally extending threaded bore (18.3), and two planes of the coupling section (18.2) oriented parallel to a vertical plane of the control box (2, 3, 4) and two planes of the coupling section (18.2) oriented parallel to a horizontal plane of the control box (2, 3, 4), wherein for connecting horizontally and vertically arranged mounting rails (17), corner connectors (19), cross connectors, and/or T-pieces have connecting sections (19.2) that are square or rectangular in cross section and that have cross-sectional dimensions matched to widths of the profile legs of the mounting rails (17) and have transversely extending threaded bores (19.3) in support surfaces matched to a pattern spacing of the rows of fastening holes.

2. The control box arrangement as recited in claim 1, wherein each plane of the coupling section (18.2) contains at least one threaded bore (18.3) with a distance from the attachment plane of the associated frame leg (11, 12.1, 12.2) corresponds to an integral multiple of a spacing of the defined pattern.

3. The control box arrangement as recited in claim 2, wherein for attachment to the associated frame leg (11, 12.1, 12.2), the connecting piece (18) has an attaching section (18.4) with an attachment plane that extends parallel to the attachment plane of the frame leg (11, 12.1, 12.2) and that has a hook securing projection (18.6) protruding from it and hookable into one of the fastening holes of the frame leg (11, 12.1, 12.2).

4. The control box arrangement as recited claim 3, wherein in the attaching section (18.4) of the connecting piece (18) a through bore (18.5) allows a fastening screw to be inserted through.

5. The control box arrangement as recited in claim 4, wherein the mounting rail (17) has a plurality of profile legs oriented at right angles to one another and a width matched to a cross section of the coupling section (18.2) of the connecting piece (18).

6. The control box arrangement as recited in claim 5, wherein a cross section of the mounting rail (17) forms a right angle as a two-leg shape, a U-shape, a C-shape or in a shape of a closed hollow profile and is matched to the cross section of the coupling section (18.2) and all of the profile legs of the mounting rail (17) have similar rows of fastening holes as the frame legs (11, 12.1, 12.2).

7. The control box arrangement as recited in claim 6, wherein the coupling section (18.2) transitions via a shoulder (18.7) on all sides into an adjacent widened section of the connecting piece (18) and a height of the shoulder corresponds approximately to a wall thickness of the mounting rail (17).

8. The control box arrangement as recited in claim 7, wherein the rows of fastening holes have an alternating pattern of round holes and slot-shaped holes extending in a longitudinal direction of the frame legs (11, 12.1, 12.2) or the mounting rails (17).

9. The control box arrangement as recited in claim 8, wherein the frame legs (11, 12.1, 12.2) have mounting planes offset from each other in the width direction and/or in a depth direction and the connecting pieces (18) are used for attachment in both mounting planes.

10. The control box arrangement as recited in claim 9, wherein vertical mounting rails (17) are attached to frame legs (11, 12.1, 12.2) and/or the horizontal mounting rails (17) offset in the depth direction toward the inside of the control box arrangement and in the depth direction in front of the vertical mounting rails (17) functional compartments are formed one above the other and divided from one another by horizontal compartment-dividing floors (30), and closed at a rear by mounting plates (40) attached to the vertical mounting rails (17), distributing rails (55) extend vertically through a plurality of functional compartments supply power to device components accommodated in the functional compartments, and are mounted to an inside surface of the mounting plates (40).

11. The control box arrangement as recited in claim 1, wherein for attachment to the associated frame leg (11, 12.1, 12.2), the connecting piece (18) has an attaching section (18.4) with an attachment plane that extends parallel to the attachment plane of the frame leg (11, 12.1, 12.2) and that has a hook securing projection (18.6) protruding from it and hookable into one of the fastening holes of the frame leg (11, 12.1, 12.2).

12. The control box arrangement as recited claim 11, wherein in the attaching section (18.4) of the connecting piece (18) a through bore (18.5) allows a fastening screw to be inserted through.

13. The control box arrangement as recited in claim 1, wherein the mounting rail (17) has a plurality of profile legs oriented at right angles to one another and a width matched to a cross section of the coupling section (18.2) of the connecting piece (18).

14. The control box arrangement as recited in claim 1, wherein a cross section of the mounting rail (17) forms a right angle as a two-leg shape, a U-shape, a C-shape or in a shape of a closed hollow profile and is matched to the cross section of the coupling section (18.2) and all profile legs of the mounting rail (17) have similar rows of fastening holes as the frame legs (11, 12.1, 12.2).

15. The control box arrangement as recited in claim 1, wherein the coupling section (18.2) transitions via a shoulder (18.7) on all sides into an adjacent widened section of the connecting piece (18) and a height of the shoulder corresponds approximately to a wall thickness of the mounting rail (17).

16. The control box arrangement as recited in claim 1, wherein the rows of fastening holes have an alternating pattern of round holes and slot-shaped holes extending in a longitudinal direction of the frame legs (11, 12.1, 12.2) or the mounting rails (17).

17. The control box arrangement as recited in claim 1, wherein the frame legs (11, 12.1, 12.2) have mounting planes offset from each other in the width direction and/or in a depth direction and the connecting pieces (18) are used for attachment in both mounting planes.

18. A control box arrangement comprising: at least one control box (2, 3, 4) having a frame (10) constructed from vertical and horizontal frame legs (11, 12.1, 12.2) and an interior equippable with mounting parts including mounting rails (17) to permit a variable subdivision of the interior and having the frame legs (11, 12.1, 12.2) with rows of fastening holes in a defined pattern, one-piece connecting pieces (18) for connecting the mounting rails (17) to the frame legs (11, 12.1, 12.2) having a coupling section (18.2) protruding at right angles from an attachment plane of the associate frame leg (11, 12.1, 12.2) when the connecting piece is in a mounted position, the coupling section (18.2) having a square cross section or a rectangular cross section and containing at least one transversally extending threaded bore (18.3), and two planes of the coupling section (18.2) oriented parallel to a vertical plane of the control box (2, 3, 4) and two planes of the coupling section (18.2) oriented parallel to a horizontal plane of the control box (2, 3, 4), wherein vertical mounting rails (17) are attached to frame legs (11, 12.1, 12.2) and/or horizontal mounting rails (17) offset in the depth direction toward the inside of the control box arrangement and in the depth direction in front of the vertical mounting rails (17) functional compartments are formed one above the other and divided from one another by horizontal compartment-dividing floors (30), and closed at a rear by mounting plates (40) attached to the vertical mounting rails (17), distributing rails (55) extend vertically through a plurality of functional compartments supply power to device components accommodated in the functional compartments, and are mounted to an inside surface of the mounting plates (40).

19. The control box arrangement as recited in claim 18, wherein for connecting mounting rails (17), corner connectors (19), cross connectors, and/or T-pieces have connecting sections (19.2) that are square or rectangular in cross section and that have cross-sectional dimensions matched to widths of profile legs of the mounting rails (17) and have transversely extending threaded bores (19.3) in support surfaces matched to a pattern spacing of the rows of fastening holes.

* * * * *